US006315391B1

United States Patent
Kanematsu

(10) Patent No.: US 6,315,391 B1
(45) Date of Patent: Nov. 13, 2001

(54) INK-JET PRINTER AND PRINT CONTROL METHOD THEREOF

(75) Inventor: Daigoro Kanematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,374

(22) Filed: Nov. 3, 1999

(30) Foreign Application Priority Data

Nov. 5, 1998 (JP) .................................................. 10-315044

(51) Int. Cl.⁷ ..................................................... B41J 2/205
(52) U.S. Cl. .................. 347/43; 347/15; 358/521
(58) Field of Search ................................. 347/12, 15, 40, 347/41, 43; 358/502, 521

(56) References Cited

U.S. PATENT DOCUMENTS 3,977,007 * 8/1976 Berry et al. ............................ 347/15
5,832,184 * 11/1998 Konno et al. ......................... 395/102
5,923,349 * 7/1999 Meyer .................................... 347/43
5,992,971 11/1999 Takahashi et al. .................... 347/43
6,042,212 * 3/2000 Takahashi et al. .................... 347/15
6,108,102 * 8/2000 Tanaka et al. ........................ 358/1.9

FOREIGN PATENT DOCUMENTS 58-39468  3/1983  (JP) .
9-83794   3/1997  (JP) .

\* cited by examiner

*Primary Examiner*—N. Le
*Assistant Examiner*—Lamson D. Nguyen
(74) *Attorney, Agent, or Firm*—Fitzpatrick, Cella, Harper & Scinto

(57) ABSTRACT

In an ink-jet printer, upon assigning input image data quantized to n-valued data (n≧3) at a predetermined resolution to an L (horizontal)×M (vertical) dot matrix, one of, e.g., eight different dot matrix patterns is irregularly selected on the basis of a random number value consisting of a predetermined number of bits, and the selected pattern is assigned.

17 Claims, 13 Drawing Sheets

|  | +0 | +1 | +2 | +3 | +4 | +5 | +6 | ... | +255 |
|---|---|---|---|---|---|---|---|---|---|
| 0000h | 0h | 0h | 0h | 0h | 0h | 0h | 0h | ... | 0h |
| 0100h | 1h | 1h | 1h | 1h | 1h | 1h | 1h | ... | 1h |
| 0200h | 2h | 2h | (2h) | 2h | 2h | 2h | 2h | ... | 2h |
| 0300h | 3h | 3h | 3h | 3h | 3h | 3h | 3h | ... | 3h |
| 0400h | 4h | 4h | 4h | (4h) | 4h | 4h | 4h | ... | 4h |
| 0500h | 5h | 5h | 5h | 5h | 5h | 5h | 5h | ... | 5h |
| 0600h | 6h | 6h | 6h | 6h | 6h | 6h | 6h | ... | 6h |
| 0700h | 7h | 7h | 7h | 7h | 7h | 7h | 7h | ... | 7h |
| 0800h | 8h | 8h | 8h | 8h | 8h | 8h | 8h | ... | 8h |
| 0900h | 9h | 9h | 9h | 9h | 9h | 9h | 9h | ... | 9h |
| 0A00h | Ah | Ah | Ah | Ah | Ah | Ah | Ah | ... | Ah |
| 0B00h | Bh | Bh | Bh | Bh | Bh | Bh | Bh | ... | Bh |
| 0C00h | Ch | Ch | Ch | Ch | Ch | Ch | Ch | ... | Ch |
| 0D00h | Dh | Dh | Dh | Dh | Dh | Dh | Dh | ... | Dh |
| 0E00h | Eh | Eh | Eh | Eh | Eh | Eh | Eh | ... | Eh |
| 0F00h | Fh | Fh | Fh | Fh | Fh | Fh | Fh | ... | Fh |

RANDOM NUMBER A=0202h
RANDOM NUMBER B=0403h
TRANSPORT CONTENTS AT ADDRESSES 0202h AND 0403h

COMPLEMENTARY RELATIONSHIP

FIG. 11

|  | NO.1 | NO.2 | NO.3 | NO.4 |  |
|---|---|---|---|---|---|
| LEVEL 1 | | | | | NUMBER OF PRINT DOTS=0 |
| LEVEL 2 | | | | | NUMBER OF PRINT DOTS=1 |
| LEVEL 3 | | | | | NUMBER OF PRINT DOTS=2 |
| LEVEL 4 | | | | | NUMBER OF PRINT DOTS=3 |
| LEVEL 5 | | | | | NUMBER OF PRINT DOTS=4 |
| LEVEL 6 | | | | | NUMBER OF PRINT DOTS=6 |
| LEVEL 7 | | | | | NUMBER OF PRINT DOTS=8 |
| LEVEL 8 | | | | | NUMBER OF PRINT DOTS=10 |
| LEVEL 9 | | | | | NUMBER OF PRINT DOTS=12 |

FIG. 12

ONE-DOT PRINTING PIXEL

| RANDOM NUMBER VALUE % 4 | PASS |
|---|---|
| 0 | FIRST PASS |
| 1 | SECOND PASS |
| 2 | THIRD PASS |
| 3 | FOURTH PASS |

FIG. 13

TWO-DOT PRINTING PIXEL

| RANDOM NUMBER VALUE % 6 | PASS |
|---|---|
| 0 | FIRST AND SECOND PASSES |
| 1 | FIRST AND THIRD PASSES |
| 2 | FIRST AND FOURTH PASSES |
| 3 | SECOND AND THIRD PASSES |
| 4 | SECOND AND FOURTH PASSES |
| 5 | THIRD AND FOURTH PASSES |

INK-JET PRINTER AND PRINT CONTROL METHOD THEREOF

BACKGROUND OF THE INVENTION

The present invention relates to an ink-jet printer and print control method thereof and, more particularly, to an ink-jet printer of a dot-matrix print scheme for printing by rasterizing n-valued (n≧3) quantization data (n valued; n is a natural number) onto an L (horizontal)×M (vertical) matrix, and print control method thereof.

Various color print schemes that are currently known include a thermal transfer scheme for transferring ink of an ink ribbon by heat energy, an ink-jet print scheme for printing by making ink droplets fly and attach to a printing medium such as paper or the like, and the like.

In such color print schemes, especially, the ink-jet print scheme is a non-impact print scheme free from any noise produced upon printing, can achieve high-speed printing, and can print on normal paper without requiring any dedicated fixing process. Also, since the apparatus arrangement is relatively simple, a color system can be easily implemented.

In recent years, it has been attempted to use ink-jet printers with these advantages to form higher-quality images by increasing the resolution of printed images using ink droplets having smaller sizes.

However, as the resolution of a printed image becomes higher, the data size to be processed in the apparatus becomes huge. In a print system including a host apparatus such as a computer and an ink-jet printer, low data processing speed in the host apparatus or low data transfer speed upon transferring data from the host apparatus to the printer considerably lowers the throughput of the overall system.

Furthermore, as the resolution of a printed image becomes higher, the memory size required in the ink-jet printer main body must be increased, resulting in an increase in apparatus cost.

For this reason, when an image to be printed by the ink-jet printer has priority on the grayscale (the number of colors) over the resolution like a photograph, the host apparatus transfers image data which has a relatively low resolution and has undergone a multi-valued quantization process (to be referred to as highly-quantized image data hereinafter) to the printer, and rasterizes the received low-resolution, highly-quantized image data on a predetermined matrix, thus implementing so-called dot-matrix printing.

For example, assuming that the host apparatus quantizes image data to 9-valued (4-bit) data at a resolution of 300 (horizontal)×300 (vertical) DPI (dot per inch), and the printer prints by rasterizing that quantized image data at 1,200 (horizontal)×600 (vertical) DPI (4×2 matrix), since the process in the host apparatus is done at 300 DPI, the load on the host apparatus can be reduced. Since 300-DPI, 4-bit image data corresponds to 600×600 DPI, 1-bit image data, the data size to be transferred to the printer can be half that of 1,200×600 DPI, 1-bit image data. Hence, the size of a reception buffer required in the printer can be halved.

However, when an ink-jet printer, which sets a printing resolution as relatively high as 1,200 (horizontal)×600 (vertical) DPI, prints an image by dot-matrix printing, the following problems are posed.

That is, as a matrix pattern for rasterizing image data which has been quantized to 9-valued data at a resolution of 300×300 DPI onto a 4×2 matrix, one fixed pattern is used for a predetermined grayscale level. Hence, since an identical matrix pattern is used on an image on which an identical grayscale level appears continuously, periodic nonuniform or stripe patterns appear on the actually printed images due to errors of ejection precision of ink droplets by a printhead, paper feed precision of the printer main body, or feed precision of a carriage.

Since a predetermined grayscale level is expressed using an identical dot pattern, pseudo edges appear in the printed image if such dot pattern is continuously used.

SUMMARY OF THE INVENTION

It is, therefore, an object of the present invention to provide an ink-jet printer and print control method thereof, which can provide a high-quality printed image free from any nonuniform or stripe patterns or any pseudo edges.

In order to achieve the above object, an ink-jet printer according to the present invention is characterized by comprising the following arrangement.

That is, there is provided an ink-jet printer, which prints an image on a printing medium by assigning input image data, that has been quantized to n-valued data (n≧3; n is a natural number) at a predetermined resolution, to a dot matrix, and ejecting ink in a dot pattern of the assigned dot matrix, comprising: matrix storage means for pre-storing a plurality of dot matrices having different dot patterns with respect to input image data of an identical signal level; random number generation means for generating an arbitrary random number value consisting of a predetermined number of bits; and dot matrix assignment means for selecting a given dot matrix corresponding to a signal level of the input image data from the plurality of dot matrices stored in the matrix storage means on the basis of the random number value acquired from the random number generation means, assigning the selected dot matrix to the input image data, and rasterizing a dot pattern of the assigned dot matrix on a buffer.

For example, the input image data is color image data, and the dot matrix assignment means assigns some dot matrices in units of colors.

For example, the color image data includes color image data which represent dark and light colors which belong to an identical color family, the plurality of dot matrices store pairs of dot matrices for the dark and light colors with respect to the color image data of the identical signal level, and the dot matrix assignment means assigns a dot matrix corresponding to color image data of one of colors that belong to the identical color family, and also assigns a dot matrix of a color which is paired with that dot matrix.

For example, the ink-jet printer is capable of printing plural times on a single pixel, and the ink-jet printer further comprises print control means for printing a plurality of dots on at least one pixel included in a dot pattern rasterized on the buffer when an image is printed in accordance with the dot pattern.

In order to achieve the above object, a print control method of an ink-jet printer according to the present invention is characterized by the following arrangement.

That is, there is provided a print control method for an ink-jet printer, which prints an image on a printing medium by assigning input image data, that has been quantized to n-valued data (n≧3; n is a natural number) at a predetermined resolution, to a dot matrix, and ejecting ink in a dot pattern of the assigned dot matrix, comprising the steps of: preparing in advance a plurality of dot matrices having different dot patterns with respect to input image data of an identical signal level; selecting a given dot matrix corresponding to a signal level of the input image data from the plurality of dot matrices on the basis of a random number value consisting of a predetermined number of bits, and assigning the selected dot matrix to the input image data; and rasterizing a dot pattern of the assigned dot matrix on a buffer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view for explaining generation of a random number sequence used in the first embodiment of the present invention;

FIG. 7 shows matrix patterns used in the third embodiment of the present invention;

FIG. 11 shows matrix patterns used in the fourth embodiment of the present invention;

FIG. 12 shows passes of a one-dot printed pixel in multi-pass printing according to the fourth embodiment of the present invention;

FIG. 13 shows passes of a two-dot printed pixel in multi-pass printing according to the fourth embodiment of the present invention;

DETAILED DESCRIPTION OF THE PREFERRED EMBODIMENTS

Figure 1:
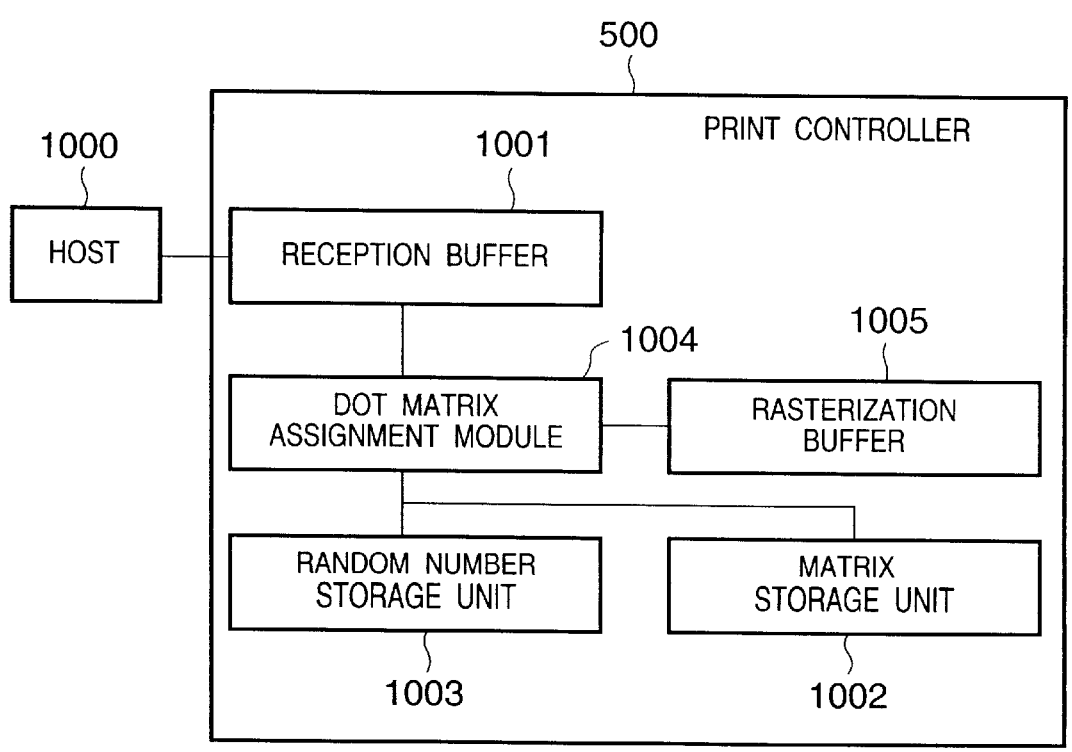
FIG. 1 is a block diagram for explaining the arrangement of a print controller of an ink-jet printer according to the first embodiment of the present invention.

The preferred embodiments of an ink-jet printer according to the present invention will be described hereinafter with reference to the accompanying drawings. A print method as the characteristic feature of the present invention will be explained first with reference to FIGS. 1 to 13, and the overall arrangement of the ink-jet printer will then be explained with reference to FIGS. 14 to 16.

An outline of embodiments to be described later will be explained first. Upon assigning data which is quantized to n-valued (n≧3; n is a natural number) data at a predetermined resolution (to be referred to as quantized data hereinafter) onto an L (horizontal)×M (vertical) dot matrix, one of a plurality of dot matrices having different dot patterns is irregularly selected on the basis of a random number value consisting of a predetermined number of bits, and is assigned to quantized data having an identical signal level, i.e., quantized image data having an identical signal level. By printing an image using the assigned dot patterns, density nonuniformity and stripe patterns that appear in a printed image due to errors of ejection performance and mechanical precision of a printhead of an ink-jet printer that prints images with relatively high resolution, and pseudo edges formed due to the use of an identical dot pattern can be suppressed.

Furthermore, upon selecting a dot matrix, dot patterns are independently and irregularly selected in correspondence with yellow (Y), magenta (M), cyan (C), and black (K), and dots are assigned to the selected patterns. In this way, dot patterns can be prevented from being tuned among colors, and density nonuniformity, stripe patterns, and pseudo edges formed in a printed image due to tuning among dot patterns of the respective colors can be eliminated.

In an ink-jet printer that uses inks that belong to an identical color family but have different densities, dots are irregularly assigned without disturbing the complementary relationship of a dot matrix printed using the inks of the respective densities, thus preventing density nonuniformity, stripe patterns, and pseudo edges formed in a printed image portion having colors that belong to an identical color family, when dark and light inks are used.

In an ink-jet printer that implements multi-pass printing, two print dots are assigned to at least one pixel used in a dot matrix, thus preventing density nonuniformity, stripe patterns, and pseudo edges formed in a printed image due to dot offsets in that matrix.

First Embodiment

In this embodiment, upon assigning data which is quantized to n-valued (n≧3; n is a natural number) data at a predetermined resolution (to be referred to as quantized data hereinafter) onto an L (horizontal)×M (vertical) dot matrix, one of assignment patterns of a plurality of dot matrices is irregularly selected on the basis of a random number value consisting of a predetermined number of bits, and is assigned to quantized data having an identical signal level, i.e., quantized image data having an identical signal level.

An ink-jet printer in this embodiment comprises an apparatus arrangement (to be described later).

FIG. 1 is a block diagram for explaining the arrangement of a print controller of an ink-jet printer according to the first embodiment of the present invention.

As shown in FIG. 1, a print controller 500 of the ink-jet printer comprises a reception buffer 1001 for receiving quantized data from a host apparatus 1000, a matrix storage unit 1002 for storing matrix patterns, a random number storage unit 1003 for storing random numbers each consisting of a predetermined number of bits, a dot matrix assignment module 1004 for assigning a dot matrix to the quantized data in the reception buffer 1001 using the random number value and matrix pattern, and a rasterization buffer (print buffer) 1005 on which the quantized data to which the dot matrix is assigned by the dot matrix assignment module 1004 is rasterized. The actual arrangement of the print controller 500 will be explained later with reference to FIG. 16. The dot matrix assignment module 1004 is a software module which is pre-stored in a ROM 402 and is implemented by an MPU 401. The reception buffer 1001, matrix storage unit 1002, and rasterization buffer 1005 are assured on predetermined address areas on a DRAM 403 shown in FIG. 16.

Figure 2:
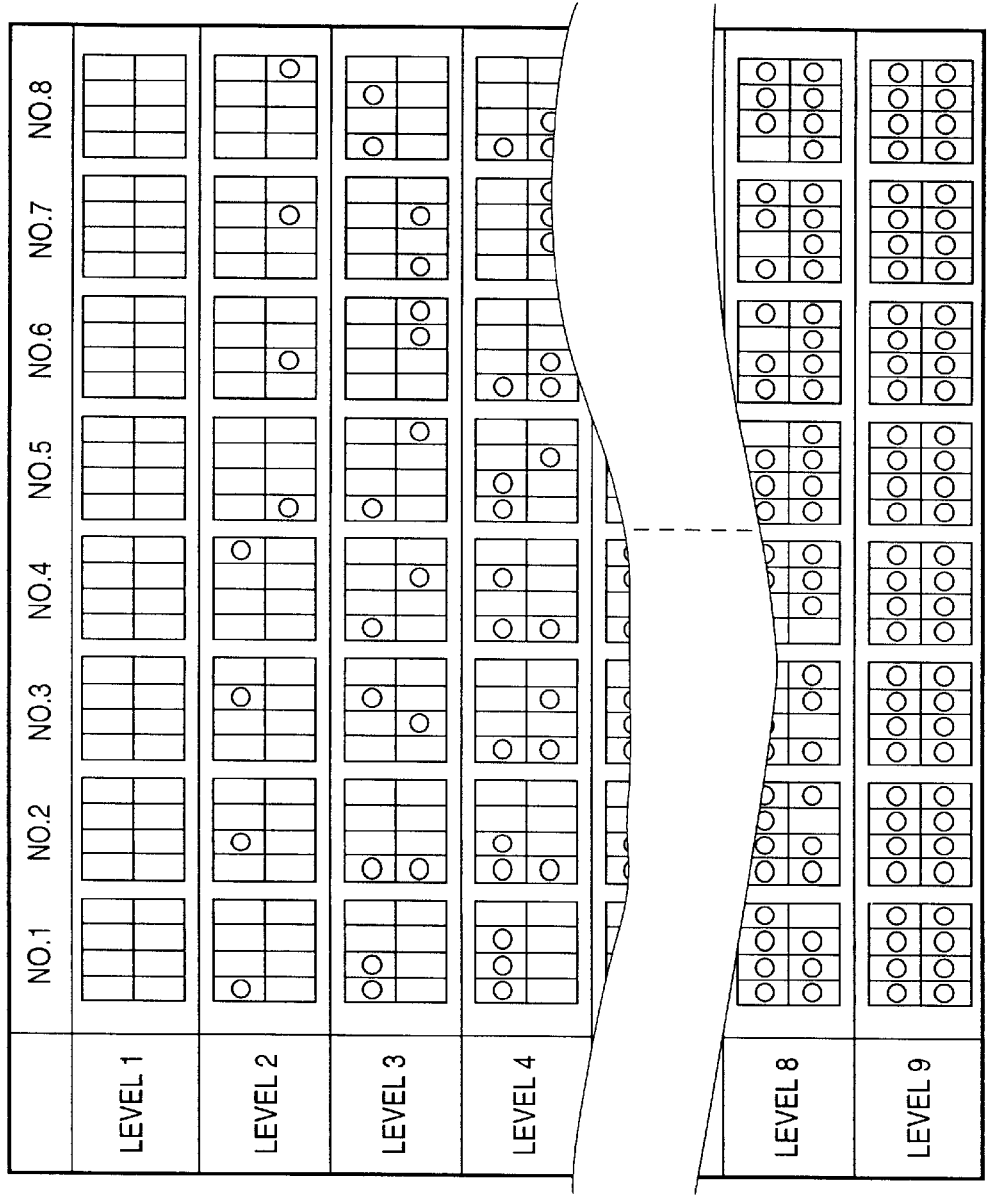
FIG. 2 shows matrix patterns used in the first embodiment of the present invention.

The matrix storage unit 1002 pre-stores dot matrix patterns that quantized data of the respective signal levels, i.e., from level 1 to level 9 as shown in FIG. 2, can assume, while numbers (Nos. 1 to 8) are assigned thereto. In this embodiment, a maximum of eight different patterns can be stored in correspondence with quantized data of a given level for the sake of simplicity. However, the present invention is not limited to such specific number of patterns, and the number of patterns stored is preferably optimized in accordance with the configuration and the like of the printer.

In this embodiment, if dot matrices having eight or more different patterns are required, an identical pattern is used for the sake of simplicity.

Figure 4:
FIG. 4 is a view for explaining generation of a random number sequence used in the first embodiment of the present invention.

The random number storage unit 1003 stores 4-bit (0 to 15) random number data. More specifically, in this embodiment, data for 16 kbytes (4,096 random numbers ranging from 0 to 15) are stored. In this case, in order to obtain nearly equal numbers of 4-bit random numbers ranging from 0 to 15, a random number sequence is preferably generated by the method shown in FIGS. 3 and 4. That is, as shown in FIG. 3, the respective values of 4-bit (0 to 15) random number data are lined up 256 each in a memory. Two addresses (0 to 4,095) are generated by random number values, and data stored at the generated addresses are transposed. By repeating this process a predetermined number of times (e.g., 0.2 million times), a random number sequence shown in FIG. 4 is prepared.

A sequence for selecting any of a plurality of dot matrix patterns stored in the matrix storage unit 1002 and rasterizing the selected pattern on the rasterization buffer 1005 will be explained below with reference to FIG. 5.

In this embodiment, assume that image data that has been quantized to 9-valued (4-bit) data at a resolution of 300 (horizontal)×300 (vertical) DPI in the host apparatus 1000 is rasterized to print data having a resolution of 1,200 (horizontal)×600 (vertical) DPI (4×2 dot matrix) in the ink-jet printer of this embodiment, and the rasterized data is printed.

Figure 5:
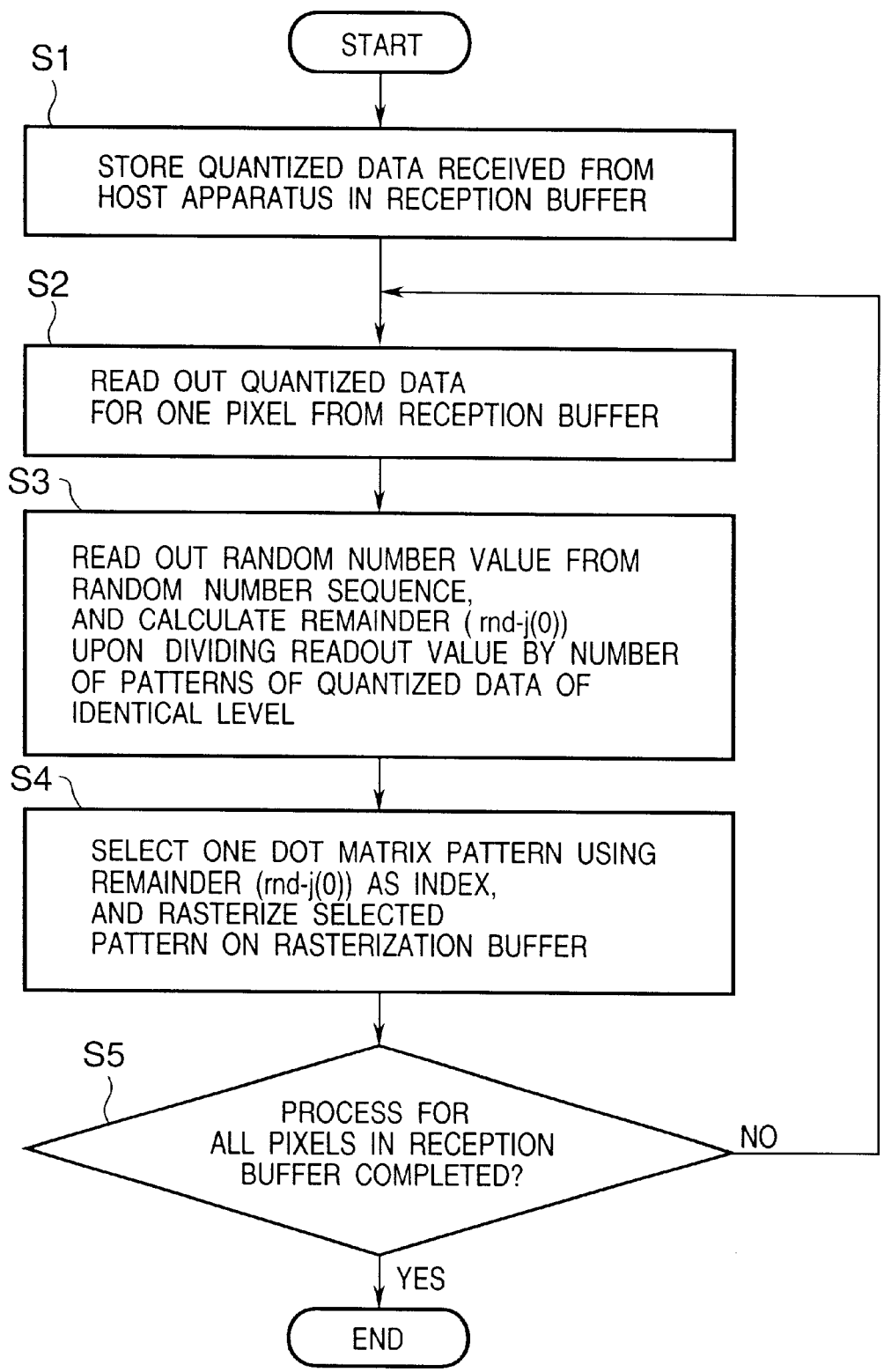
FIG. 5 is a flow chart showing a data rasterization process in the first embodiment of the present invention.

FIG. 5 is a flow chart showing the data rasterization process in the first embodiment of the present invention, which process is implemented by the dot matrix assignment module 1004. A description of this process will be given below with reference to FIG. 5.

Step S1: 4-bit quantized data (corresponding to 0 to 8 since it is 9-valued data) transferred from the host apparatus 1000 is received, and is stored in the reception buffer 1001.

Step S2: 4-bit quantized data (a0 to a8) for one pixel is read out from the quantized data stored in the reception buffer 1001.

Step S3: One 4-bit random number value (rnd(0)) is read out from the random number sequence (FIG. 4) stored in the random number storage unit 1003. In this embodiment, since the number of patterns of quantized data of an identical signal level (to be referred to an identical level hereinafter) is eight, the remainder (rnd_j(0)=rnd(0)%8=0 to 7) upon dividing the readout random number value by 8 is calculated.

Step S4: The plurality of dot matrix patterns (those shown in FIG. 2 in this embodiment) pre-stored in the matrix storage unit 1002 are referred to using the calculated remainder (rnd_j(0)) as an index number to select a certain dot matrix pattern corresponding to the quantized data (a0 to a8) for one pixel, which is read out in step S2. The selected dot matrix pattern is rasterized on the rasterization buffer 1005.

Step S5: It is checked if all the pixels of image data stored in the reception buffer 1001 in step S1 have been rasterized on the rasterization buffer 1005. If pixels to be rasterized still remain (NO in step S5), the flow returns to step S2. On the other hand, if YES in step S5, the data rasterization process ends.

Figure 6:
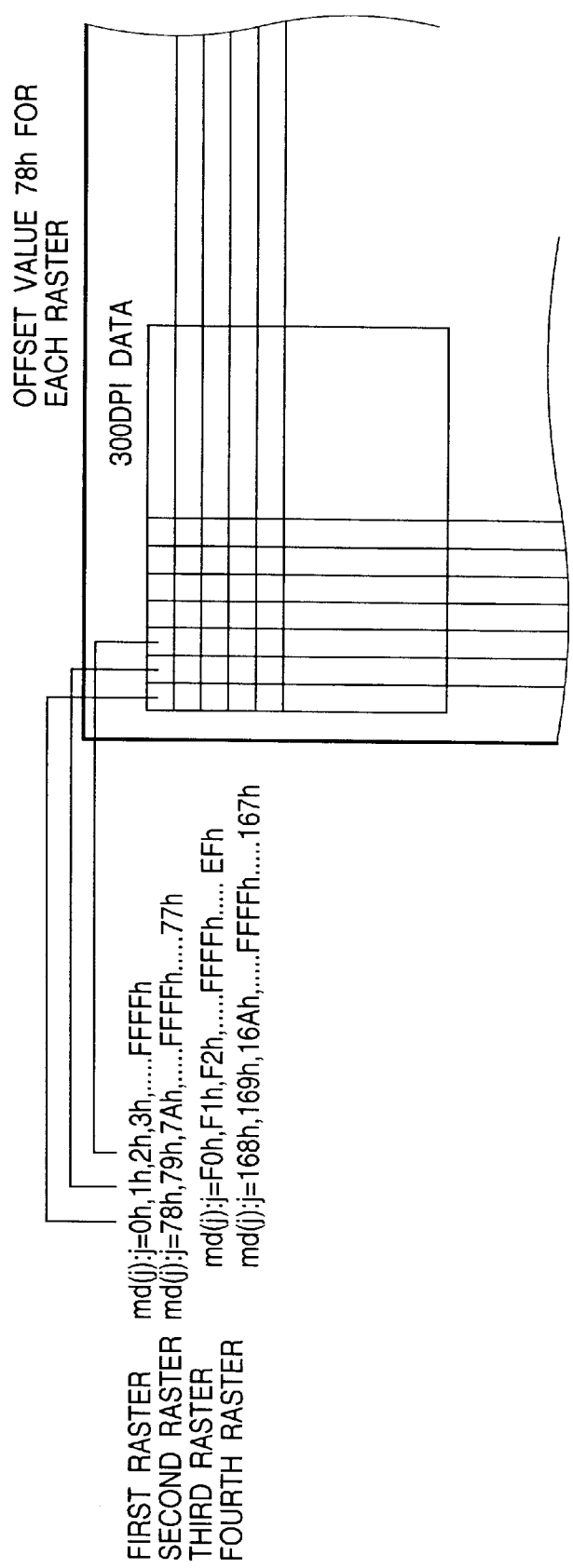
FIG. 6 is a view for explaining the method of using a random number sequence in the first embodiment of the present invention.

In this embodiment, since the random number sequence contains only 4,096 values, when 4,096 pixels have been rasterized on the rasterization buffer 1005, the random number sequence referred to starts from 0 again. In this case, if the data length of one raster is 4,096 pixels, periodicity appears in the random number sequence referred to. Hence, as shown in FIG. 6, an offset value (120 pixels=78 h in this embodiment), which is not divisible by the number of random numbers, is preferably added to the start address of the random number sequence used in units of rasters, so as to prevent periodicity from appearing in the random number sequence irrespective of the data size of the data length per raster.

As described above, according to this embodiment, in place of using a certain fixed dot matrix pattern for quantized data of an identical level, one of eight different dot matrix patterns per level stored in the matrix storage unit 1002 is irregularly selected using the random number sequence stored in the random number storage unit 1003, and the selected dot matrix pattern is rasterized on the rasterization buffer 1005. By printing print data which is rasterized in this way, any periodicity of dot sequences that may appear in a printed image at a predetermined period (300-DPI period in this embodiment) can be removed, and density nonuniformity, stripe patterns, and pseudo edges that appear in a printed image arising from errors of ejection performance and mechanical precision of a printhead can be suppressed.

Second Embodiment

This embodiment is different from the first embodiment in that dot matrix patterns are independently and irregularly selected in units of colors (Y (yellow), M (magenta), C (cyan), K (black)), thus preventing dot patterns from being tuned among colors, and eliminating density nonuniformity, stripe patterns, and pseudo edges resulting from tuning of dot patterns among colors.

In this embodiment, since the data rasterization process sequence implemented by the dot matrix assignment module 1004 is basically the same as that in the first embodiment, except that the process is done in units of Y, M, C, and K, the process will be explained with reference to FIG. 5 again.

Step S2: 4-bit quantized data (Ya0 to Ya8, Ma0 to Ma8, Ca0 to Ca8, Ka0 to Ka8) for one pixel are read out from the quantized data of the respective colors stored in the reception buffer 1001.

Step S3: Four 4-bit random number values (rnd(0, 512, 1024, 1536)) at addresses added with a predetermined offset value are read out by referring to the random number sequence shown in FIG. 4. In this embodiment, since the number of patterns of quantized data of an identical level is eight, the remainders (rnd_j(0, 512, 1024, 1536)=rnd(0, 512, 1024, 1536)%8=0 to 7) upon dividing the readout random number values by 8 are calculated.

Step S4: The plurality of dot matrix patterns (those shown in FIG. 2 in this embodiment) pre-stored in the matrix storage unit 1002 are referred to using the calculated remainders (rnd_j(0, 512, 1024, 1536)) as index numbers in units of colors to select certain dot matrix patterns corresponding to the quantized data (Ya0 to Ya8, Ma0 to Ma8, Ca0 to Ca8, Ka0 to Ka8) for one pixel, which are read out in step S2, in units of colors. The selected dot matrix patterns are rasterized on the rasterization buffer 1005.

Step S5: It is checked if all the pixels of image data stored in the reception buffer 1001 in step S1 have been rasterized on the rasterization buffer 1005. If pixels to be rasterized still remain (NO in step S5), the processing continues until data for one raster have been rasterized on the rasterization buffer 1005. On the other hand, if YES in step S5, the data rasterization process ends.

The address of the random number sequence used upon rasterizing the respective color data on the rasterization buffer 1005 is incremented only when image data of the corresponding one of the four colors Y, M, C, and K is present in the pixel of interest.

Upon rasterizing image data for the second raster on the rasterization buffer 1005, random number values at addresses added with a predetermined offset value (120=78 h in this case) are read out. If one pixel in the second raster includes Y, M, and C data, random number values (rnd(120, 532, 1144) are read out, the remainders upon dividing the readout random number values 8 are calculated, and the aforementioned process is repeated. Likewise, the rasterization process is repeated for all rasters.

As described above, according to this embodiment, dot matrix patterns are independently and irregularly selected in units of colors (Y, M, C, and K), and the selected dot matrix patterns are rasterized on the rasterization buffer. In this way, dot patterns can be prevented from being tuned among colors, and density nonuniformity, stripe patterns, and pseudo edges formed in a printed image due to tuning among dot patterns of the respective colors can be eliminated.

Third Embodiment

This embodiment has as its object to prevent density nonuniformity, stripe patterns, and pseudo edges by irregularly assigning dots to a dot matrix without disturbing the complementary relationship between data belonging to an identical color family when there are two or more data to be rasterized based on quantized data with respect to inks belonging to the identical color family. Hence, a data rasterization method in an ink-jet printer, which uses a total of six color inks, that is, two light inks, i.e., light M and light C in addition to four inks Y, M, C, and K, will be explained.

In the host apparatus 1000, Y and K data are quantized to 9-valued data at 300 (horizontal)×300 (vertical) DPI as in the first embodiment, and M and C data are quantized to 16-valued data at 300 (horizontal) ×300 (vertical) DPI. These quantized image data are transferred to the printer.

Figure 7:
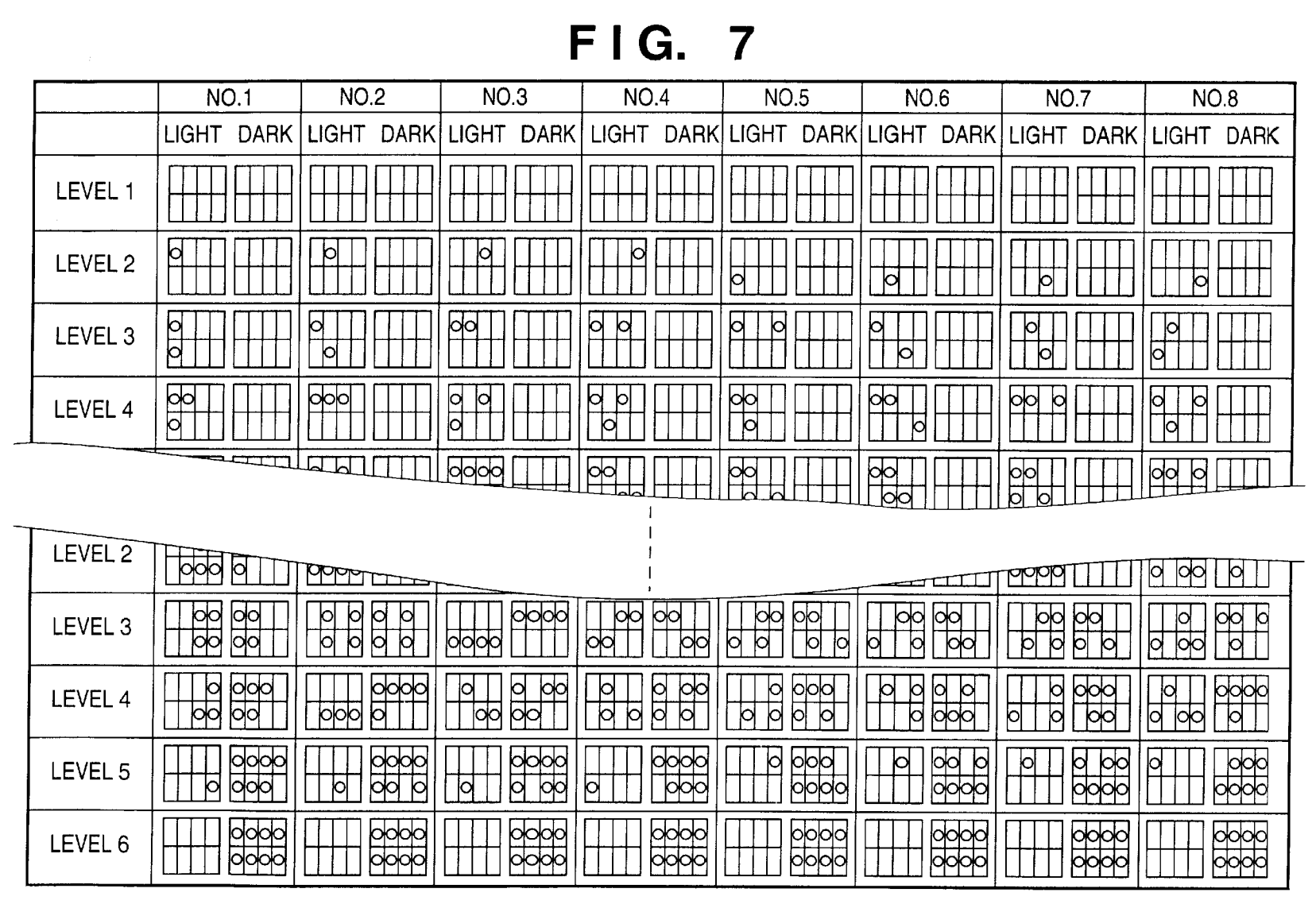

In the ink-jet printer of this embodiment, since Y and K data are processed in the same manner as in the first embodiment, and the data rasterization process is done using the matrix patterns (FIG. 2) pre-stored in the matrix storage unit 1002, a detailed description thereof will be omitted. As for M and C data, dot matrix patterns for light inks and those for dark inks are complementary to each other in correspondence with 16 levels, as shown in FIG. 7. The matrix patterns shown in FIG. 7 are stored in advance in the matrix storage unit 1002 and are used in the data rasterization process.

The data rasterization process sequence for dark and light M and C data is basically the same as that in the first and second embodiment, except that the patterns corresponding to dark and light inks shown in FIG. 7 are used.

That is, the sequence will be explained below with reference to FIG. 5.

The dot matrix assignment module 1004 reads out 4-bit quantized data (Ya0 to Ya8, Ma0 to Ma8, Ca0 to Ca8, Ka0 to Ka8) for one pixel of the individual colors from the quantized data stored in the reception buffer 1001 in step S1 (step S2).

Subsequently, the dot matrix assignment module 1004 reads out four 4-bit random number values (rnd(0, 512, 1024, 1536)) from the random number sequence (FIG. 4) at addresses added with a predetermined offset value (step S3). In this embodiment as well, since the number of patterns of quantized data of an identical level is eight, the remainders (rnd_j(0, 512, 1024, 1536)=rnd(0, 512, 1024, 1536)%8=0 to 7) upon dividing the readout random number values by 8 are calculated.

The dot matrix assignment module 1004 refers to the plurality of dot matrix patterns stored in the matrix storage unit 1002 using the remainders (rnd_j(0, 512, 1024, 1536)) as index numbers of the individual colors to select certain dot matrix patterns corresponding to the readout 4-bit quantized data (Ya0to Ya8, Ma0 to Ma8, Ca0 to Ca8, Ka0 to Ka8) for one pixel of the individual colors, and rasterizes the quantized data on the rasterization buffer 1005 using the selected patterns (step S4). At this time, the module 1004 refers to the matrix patterns shown in FIG. 2 for Y and K data. On the other hand, the module 1004 refers to the matrix patterns shown in FIG. 7 for M and C data and rasterizes light and dark ink data using the selected patterns.

As described above, according to this embodiment, when there are two or more data to be rasterized based on quantized data with respect to inks belonging to the identical color family, dark and light dot offsets in a printed image can be prevented and any periodicity of dark and light dots can also be prevented at 300 DPI by irregularly assigning data to dot matrices without disturbing the complementary relationship between the data belonging to the identical color family.

Fourth Embodiment

This embodiment prevents density nonuniformity, stripe patterns, and pseudo edges formed in a printed image due to dot offsets in a dot matrix by assigning two printing dots to at least one pixel in that dot matrix used in an ink-jet printer performing multi-pass printing.

Figure 8:
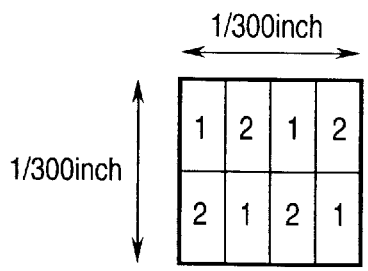
FIG. 8 is a view for explaining the number of printed dots in a matrix pattern in the fourth embodiment of the present invention.

In this embodiment, pixels printed by one dot, and those printed by two dots are assigned to eight pixels in a dot matrix. FIG. 8 shows the assignment method. Eight boxes respectively represent pixels, and the numerals in those boxes represent the number of dots to be printed. Hence, in this embodiment, a maximum of 12 dots can be printed within one dot matrix using this mask pattern. In this manner, the dynamic range of a printed image can be broadened.

In this embodiment, data is rasterized on the rasterization buffer 1005 using a plurality of matrix patterns shown in FIG. 11 based on the assignment method shown in FIG. 8, and rasterized print data undergoes a mask process by a general multi-pass printing (four-pass printing) scheme.

<Data Rasterization Process>

FIG. 11 shows matrix patterns used in the fourth embodiment of the present invention. Each ° mark, which represents a pixel in each dot matrix, is printed by one or two dots shown in FIG. 8. Hence, since at level 9° marks are assigned to all eight pixels, the number of dots to be printed is a total of 12 dots.

In each dot matrix shown in FIG. 11, since the individual pixels have different numbers of dots to be printed, the number of patterns for quantized data of an identical level in this embodiment can be smaller than that in the aforementioned embodiments. In this embodiment, four different patterns (Nos. 1 to 4) are used.

The data rasterization process in this embodiment will be explained below with reference to FIG. 5.

The dot matrix assignment module 1004 reads out 4-bit quantized data (a0 to a8) for one pixel in the quantized data stored in the reception buffer 1001 in step S1 (step S2).

Subsequently, the dot matrix assignment module 1004 reads out one 4-bit random number value (rnd(0)) from the random number sequence (FIG. 4). In this embodiment, since the number of patterns of quantized data of an identical level is four, the remainder (rnd_j(0)=rnd(0)%4=0 to 3) upon dividing the readout random number value by 4 is calculated (step S3).

The dot matrix assignment module 1004 refers to the plurality of dot matrix patterns (FIG. 11) pre-stored in the matrix storage unit 1002 using the calculated remainder (rnd_j(0)) as an index number to select a certain dot matrix pattern corresponding to the readout quantized data (a0 to a8) for one pixel, and rasterizes the quantized data on the rasterization buffer 1005 using the selected pattern (step S4).

<Mask Process>

Figure 9:
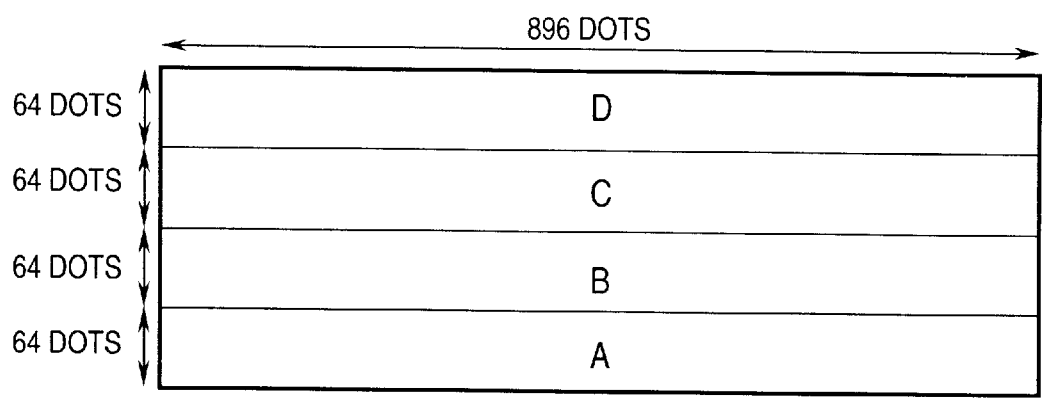
FIG. 9 is a view for explaining a random mask generation method in the fourth embodiment of the present invention.
Figure 10:
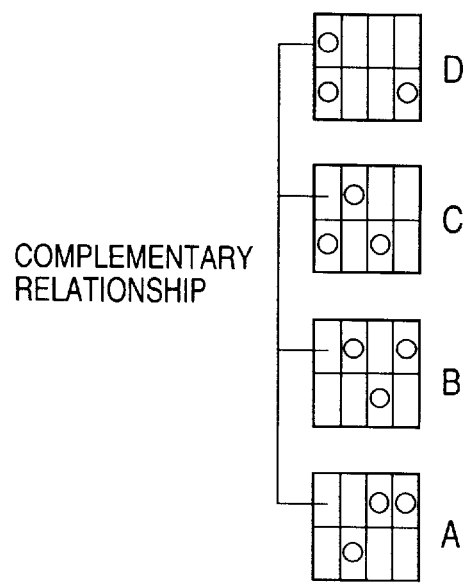
FIG. 10 is a view for explaining a random mask generation method in the fourth embodiment of the present invention.

A mask pattern used in the mask process is defined by 256 (vertical)×896 (horizontal) dots, as shown in FIG. 9, and is generated using the random number sequence shown in FIG. 4 in the first embodiment. The mask pattern shown in FIG. 9 is divided into mask regions A, B, C, and D, which are complementary to each other, as shown in FIG. 10.

In this embodiment, pixels printed by one dot and those printed by two dots shown in FIG. 8 are individually calculated prior to the data rasterization process on the rasterization buffer 1005. Since this embodiment uses four-pass printing as an example of so-called multi-pass printing, the number of passes that can print a pixel to be printed by one dot is four, i.e., the first, second, third, and fourth passes. On the other hand, the number of passes that can print a pixel to be printed by two dots is six, i.e., the first and second, first and third, first and fourth, second and third, second and fourth, and third and fourth passes. Hence, the remainder obtained by dividing a 4-bit random number value by 4 is calculated for a pixel to be printed by one dot, and the remainder obtained by dividing a 4-bit random number value by 6 is calculated for a pixel to be printed by two dots.

In order to generate a four-pass random mask required in this embodiment, 57,344 random number values (=64 (vertical)×896 (horizontal) are required. The random number sequence used in the above embodiment includes 4,096 values (/4 bits). Hence, this embodiment repetitively uses the random number sequence used in the above embodiment 14 times. However, since the horizontal size of the random mask is defined by 896 dots, even when 4,096 random number values are successively used in the horizontal direction, no periodicity is produced in the vertical direction. That is, no problem such as a texture pattern or the like produced due to tuning between the random mask used and printing data is posed in practice. Hence, the random number values used at this time in this embodiment can be read out in turn from the start address of the random number sequence shown in FIG. 4 in correspondence with a coordinate position (0, 0) to a coordinate position (0, 895) of 64×896 pixels in each pass region (A, B, C, D) shown in FIG. 8.

Then, a mask pattern is generated on the 256 (vertical)×896 (horizontal) mask region by turning on/off bits corresponding to passes (first, second, third, fourth) that correspond to the pixel of interest from the correspondence tables shown in FIGS. 12 and 13, in accordance with the calculated remainder values. Upon printing print data rasterized on the rasterization buffer 1005, multi-pass printing can be done using the generated mask pattern.

As described above, according to this embodiment, in an ink-jet printer that performs multi-pass printing, dot offsets at 300-DPI periods can be prevented by assigning two printing dots to at least one pixel of the dot matrix used, and the 4-bit random number sequence is used not only to select a matrix pattern but also to generate a mask pattern. Hence, an identical nozzle can be prevented from being periodically used, thus eliminating formation of stripe patterns and pseudo edges.

[Overall Arrangement of Ink-jet Printer]

(1) Description of Color Printer

Figure 14:
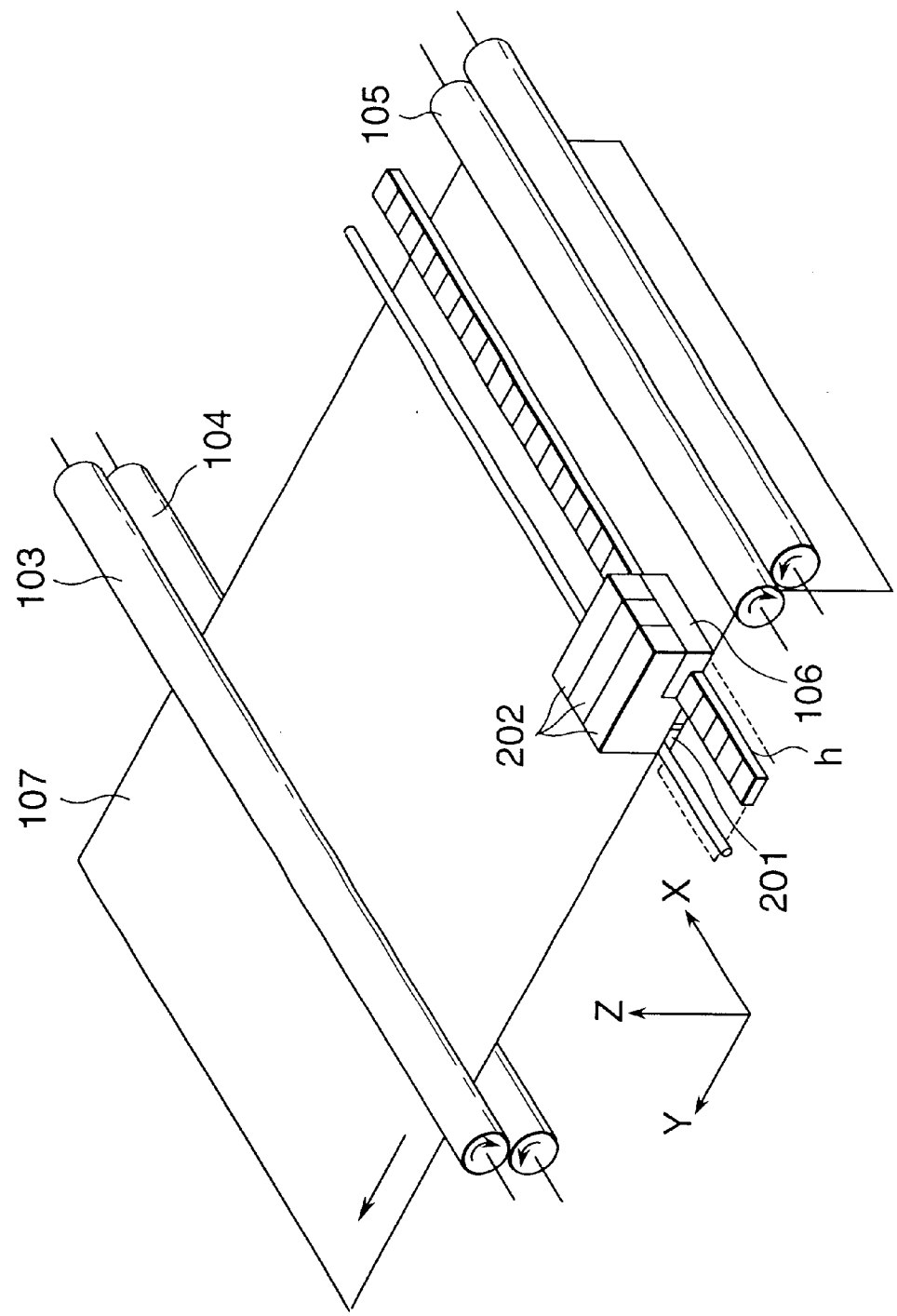
FIG. 14 is a schematic perspective view showing the arrangement of an apparatus which can be applied to an ink-jet printer of the present invention.

FIG. 14 is a schematic perspective view showing the arrangement of an embodiment of a color ink-jet printer to which the present invention can be applied.

Referring to FIG. 14, reference numeral 202 denotes ink cartridges. These ink cartridges are constructed by ink tanks which respectively store four, Y, M, C, and K color inks, and printheads 201. Reference numeral 103 denotes a paper feed roller which rotates in the direction of an arrow in FIG. 14 while pressing a printing paper sheet 107 together with an auxiliary roller 104 so as to feed the printing paper sheet 107, and to press the printing paper sheet 107. Reference numeral 106 denotes a carriage which supports four ink cartridges, and moves the ink cartridges 202 and printheads 201 as printing progresses. The carriage 106 is controlled to stand by at the home position indicated by the dotted line in FIG. 14 when the printer does not print or when the printheads undergo a recovery process.

Upon receiving a print start signal, the carriage 106, which is located at the position (home position) shown in FIG. 14 prior to the start of printing, drives printing elements provided to the printheads 201 while moving in the x-direction, and prints a region corresponding to a predetermined print width of the printheads 201 on the sheet surface. Upon completion of printing to the end portion of the sheet surface along the scanning direction of the carriage, the carriage returns to the home position, and then prints again the x-direction. The paper feed roller 103 rotates in the direction of the arrow in FIG. 14 during an interval after the previous print scan ends until the next print scan starts, thus feeding the paper sheet in the y-direction by a required width. By repeating the main scan and paper feed for printing, data can be printed on the sheet surface. Printing operations for ejecting ink from the printheads 201 are done under the control of a print control unit (not shown).

In order to increase the print speed, printing is done not only in a main scan in one direction but also in a backward movement upon returning the carriage to the home position when the main scan in the x-direction is completed.

In the above-mentioned example, the ink tanks and printheads are detachably held on the carriage 106. Alternatively, an ink cartridge that integrates the ink tanks 202 for storing printing inks and the printheads 201 for ejecting inks toward the printing paper sheet 107 may be used. Furthermore, a multi-color, integrated printhead which ejects a plurality of color inks from a single printhead may be used.

At the position where the recovery process is done, a capping unit (not shown) for capping the front surfaces (ejection port surfaces) of the heads, and a recovery unit (not shown) for making a head recovery process for removing highly viscous ink and bubbles while the heads are being capped by the capping unit are provided. Also, a cleaning blade (not shown) or the like is provided aside the capping unit, and is supported to be able to protrude toward the printheads 201 so as to come into contact with the front surfaces of the printheads. With this mechanism, after the recovery process, the cleaning blade is inserted into the moving path of the printheads so as to wipe out unnecessary ink droplets, contamination, and the like on the front surfaces of the printheads upon movement of the printheads.

(2) Description of Printhead

The aforementioned printhead 201 will be described below with reference to FIG. 15.

Figure 15:
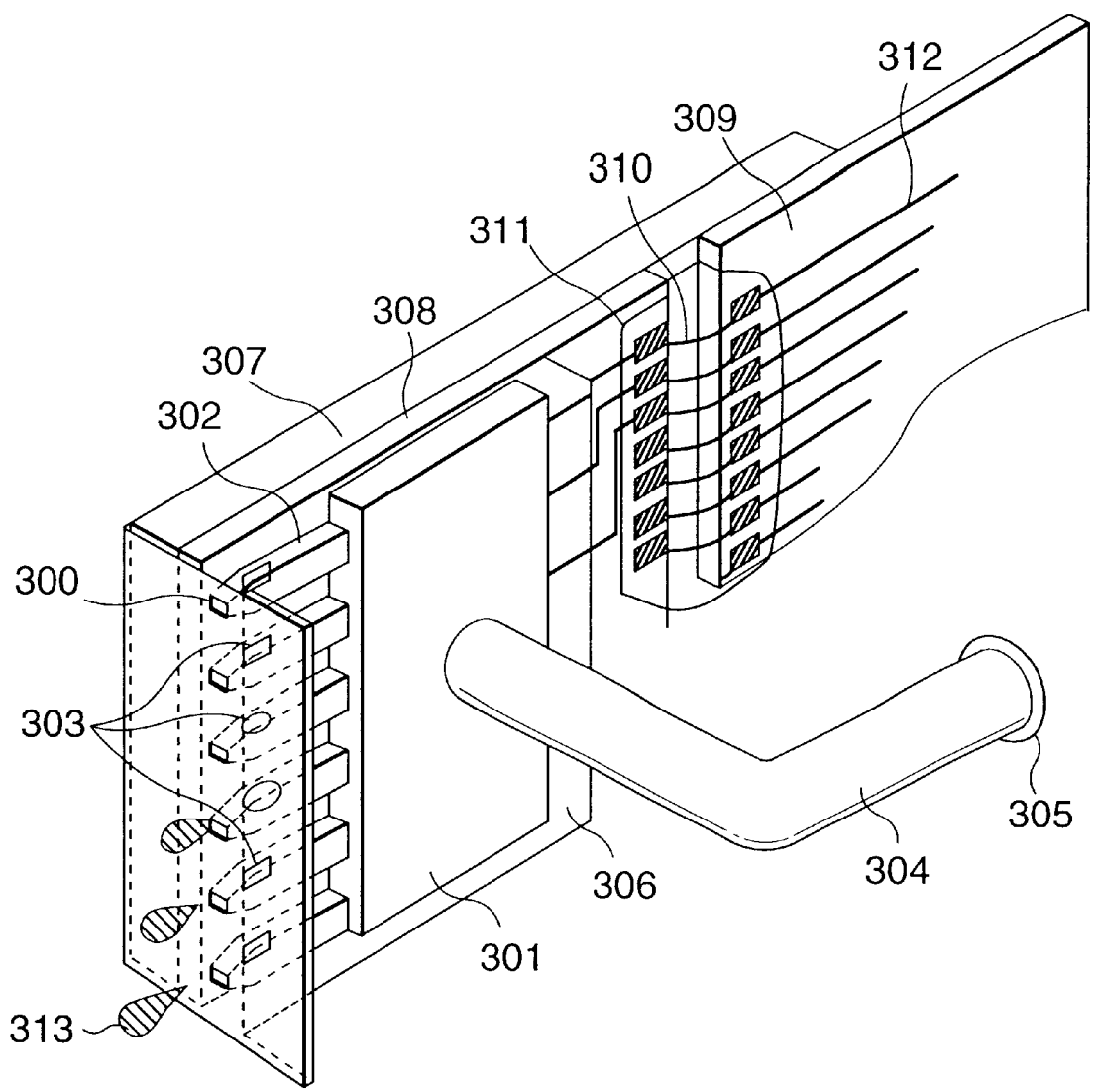
FIG. 15 is a schematic perspective view showing the arrangement of an ink-jet printhead which can be applied to the ink-jet printer of the present invention.

FIG. 15 is a perspective view showing principal part of the printhead 201 shown in FIG. 14.

As shown in FIG. 15, the printhead 201 is formed with a plurality of ejection ports 300 at a predetermined pitch, and print elements 303 for producing energy for ejecting ink are placed along the wall surfaces of ink channels 302 that connect a common ink chamber 301 and the ejection ports 300. The print elements 303 and their drive circuit are formed on a silicon substrate using a semiconductor manufacturing technique. A silicon plate 308 on which these electrical wires are formed is adhered to an aluminum base plate 307 for heat radiation. A circuit connection portion 311 on the silicon plate is connected to a printed circuit board 309 via ultra-very thin wires 310, and signals from the printer main body are received via a signal circuit 312. The ink channels 302 and common ink chamber 301 are formed of a plastic cover 306 prepared by injection molding. The common ink chamber 301 is coupled to the aforementioned ink tank (see FIG. 14) via a joint pipe 304 and ink filter 305, and receives ink from the ink tank. Ink supplied from the ink tank and temporarily stored in the common ink chamber 301 enters each ink channel 302 by capillarity, and forms a meniscus at the ejection port 300 to keep the channel 302 full of ink. At this time, when the corresponding print element 303 is energized via an electrode (not shown) to produce heat, ink on that print element 303 is abruptly heated and a bubble forms in the channel 302, thus ejecting ink droplets 313 from the ejection ports 300 due to inflation of the bubbles.

(3) Description of Control Arrangement

The control arrangement for implementing print control of the respective units of the printer will be explained below with reference to the block diagram in FIG. 16.

Figure 16:
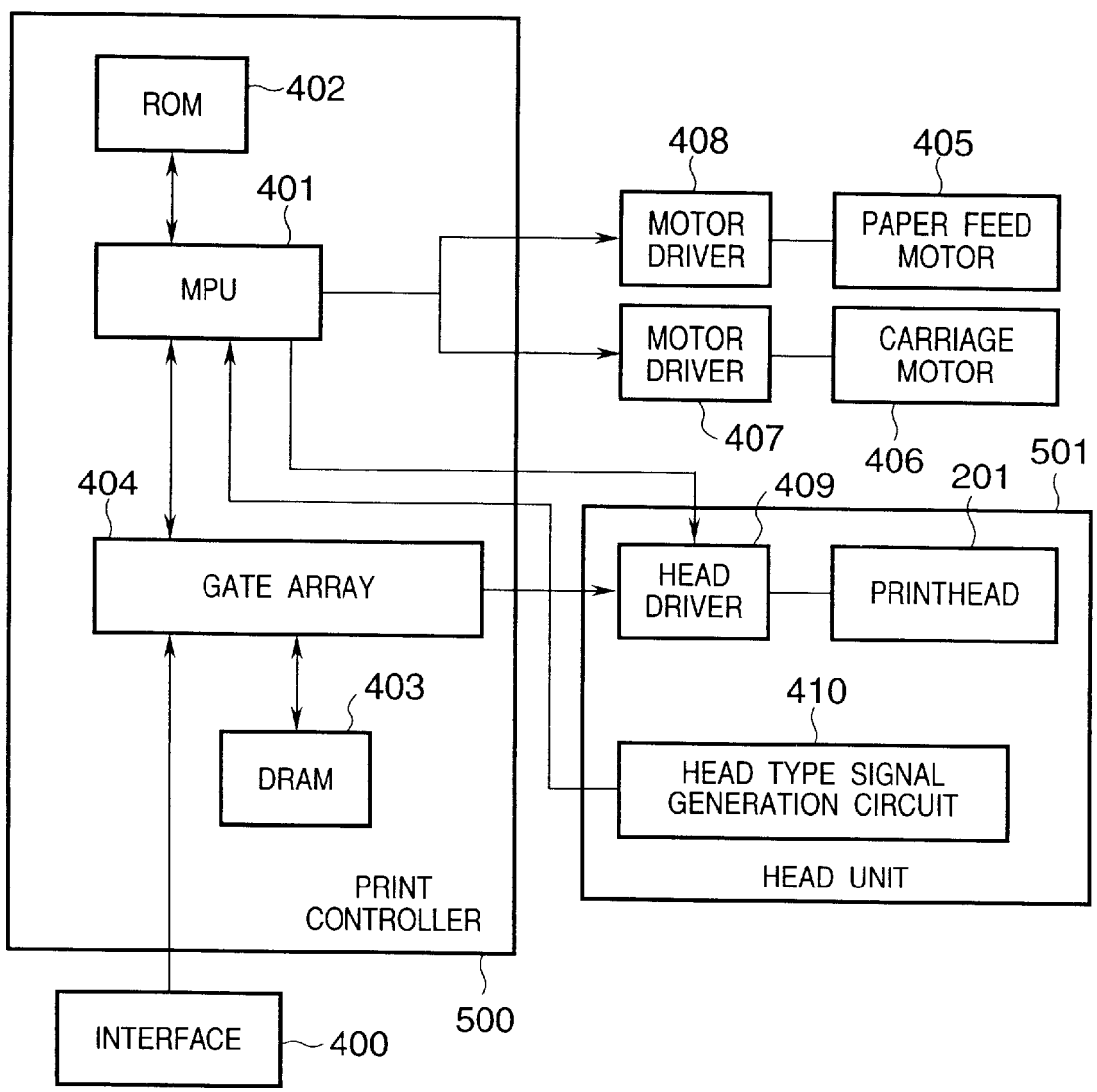
FIG. 16 is a block diagram showing the arrangement of a control circuit which can be applied to the ink-jet printer of the present invention.

Referring to FIG. 16 that shows a control circuit, reference numeral 400 denotes an interface for inputting a print signal; 401, an MPU; 402, a program ROM for storing control programs executed by the MPU 401; and 403, a dynamic RAM (DRAM) for saving various kinds of data (the print signal, print data supplied to the heads, and the like). The DRAM 403 can also store the number of print dots, the number of times of exchange of ink printheads. Reference numeral 404 denotes a gate array for controlling supply of print data to the printheads. The gate array 404 also controls data transfer among the interface 400, MPU 401, and DRAM 403. Reference numeral 406 denotes a carrier or carriage motor for conveying the printheads; and 405, a feed motor for feeding a print paper sheet. Reference numerals 407 and 408 denote motor drivers for respectively driving the carrier motor 406 and feed motor 405. Reference numeral 409 denotes a head driver for driving printheads 410.

Another Embodiment

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the above embodiments, an ink-jet printer which can provide a high-quality printed image free from any nonuniformity, stripe patterns, and pseudo edges, and print control method thereof can be provided.

As many apparently widely different embodiments of the present invention can be made without departing from the spirit and scope thereof, it is to be understood that the invention is not limited to the specific embodiments thereof except as defined in the appended claims.

What is claimed is:

1. An ink-jet printer, which prints an image on a printing medium by assigning input image data, that has been quantized to n-valued data ($n \geq 3$; n is a natural number) at a predetermined resolution, to a dot matrix, and ejecting ink in a dot pattern of the assigned dot matrix, comprising:

matrix storage means for pre-storing a plurality of dot matrices having different dot patterns with respect to input image data of an identical signal level;

random number generation means for generating an arbitrary random number value consisting of a predetermined number of bits; and dot matrix assignment means for selecting a given dot matrix corresponding to a signal level of the input image data from the plurality of dot matrices stored in said matrix storage means on the basis of the random number value acquired from said random number generation means, assigning the selected dot matrix to the input image data, and rasterizing a dot pattern of the assigned dot matrix on a buffer, wherein a plurality of the input image data of an identical signal level are printed by using the plurality of dot matrices having different dot patterns.

2. The printer according to claim 1, wherein the input image data is color image data, and said dot matrix assignment means assigns some dot matrices in units of colors.

3. The printer according to claim 2, wherein the color image data includes color image data which represent dark and light colors which belong to the same color family,
the plurality of dot matrices store pairs of dot matrices for the dark and light colors with respect to the color image data of the identical signal level, and
said dot matrix assignment means assigns a dot matrix corresponding to color image data of one of colors that belong to the same color family, and also assigns a dot matrix of a color which is paired with that dot matrix.

4. The printer according to claim 2, wherein the color image data includes yellow, magenta, cyan, and black image data.

5. The printer according to claim 3, wherein the color image data that represent the dark and light colors which belong to the same color family include magenta and cyan image data.

6. The printer according to claim 1, wherein printing can be effected a plurality of number of times on a single pixel, further comprising print control means for printing a plurality of dots on at least one pixel included in a dot pattern rasterized on the buffer when an image is printed in accordance with the dot pattern.

7. The printer according to claim 6, wherein said print control means determines a mask pattern used upon printing a plurality of dots on the single pixel on the basis of the random number value acquired from said random number generation means.

8. The printer according to claim 1, wherein said dot matrix assignment means assigns the dot matrix in accordance with a remainder obtained by dividing the random number value acquired from said random number generation means by the number of patterns of the plurality of dot matrices.

9. The printer according to claim 8, wherein said dot matrix assignment means offsets the random number value acquired from said random number generation means by a predetermined value in units of rasters.

10. A print control method for an ink-jet printer, which prints an image on a printing medium by assigning input image data, that has been quantized to n-valued data (n≧3; n is a natural number) at a predetermined resolution, to a dot matrix, and ejecting ink in a dot pattern of the assigned dot matrix, comprising the steps of:
preparing in advance a plurality of dot matrices having different dot patterns with respect to input image data of an identical signal level;
selecting a given dot matrix corresponding to a signal level of the input image data from the plurality of dot matrices on the basis of a random number value consisting of a predetermined number of bits, and assigning the selected dot matrix to the input image data; and
rasterizing a dot pattern of the assigned dot matrix on a buffer,
wherein a plurality of the input image data of an identical signal level are printed by using the plurality of dot matrices having different dot patterns.

11. The method according to claim 10, wherein the input image data is color image data, and some dot matrices are assigned in units of colors.

12. The method according to claim 11, wherein the color image data includes color image data which represent dark and light colors which belong to the same color family,
pairs of dot matrices for the dark and light colors with respect to the color image data of the identical signal level are prepared in advance as the plurality of dot matrices, and
a dot matrix corresponding to color image data of one of colors that belong to the same color family is assigned, and a dot matrix of a color which is paired with that dot matrix is also assigned.

13. The method according to claim 10, wherein said ink-jet printer is capable of printing a plurality of number of times on a single pixel, further comprising the step of printing a plurality of dots on at least one pixel included in a dot pattern rasterized on the buffer when an image is printed in accordance with the dot pattern.

14. A computer readable storage medium storing an operation control program which implements an ink-jet printer, which prints an image on a printing medium by assigning input image data, that has been quantized to n-valued data (n≧3; n is a natural number) at a predetermined resolution, to a dot matrix, and ejecting ink in a dot pattern of the assigned dot matrix, comprising:
matrix storage means for pre-storing a plurality of dot matrices having different dot patterns with respect to input image data of an identical signal level;
random number generation means for generating an arbitrary random number value consisting of a predetermined number of bits; and
dot matrix assignment means for selecting a given dot matrix corresponding to a signal level of the input image data from the plurality of dot matrices stored in said matrix storage means on the basis of the random number value acquired from said random number generation means, assigning the selected dot matrix to the input image data, and rasterizing a dot pattern of the assigned dot matrix on a buffer,
wherein a plurality of the input image data of an identical signal level are printed by using the plurality of dot matrices having different dot patterns.

15. A computer readable storage medium storing an operation control program which implements a print control method for an ink-jet printer, which prints an image on a printing medium by assigning input image data, that has been quantized to n-valued data (n≧3; n is a natural number) at a predetermined resolution, to a dot matrix, and ejecting ink in a dot pattern of the assigned dot matrix, comprising the steps of:
preparing in advance a plurality of dot matrices having different dot patterns with respect to input image data of an identical signal level;
selecting a given dot matrix corresponding to a signal level of the input image data from the plurality of dot matrices on the basis of a random number value consisting of a predetermined number of bits, and assigning the selected dot matrix to the input image data; and
rasterizing a dot pattern of the assigned dot matrix on a buffer,
wherein a plurality of the input image data of an identical signal level are printed by using the plurality of dot matrices having different dot patterns.

16. An ink-jet printer, which prints an image on a printing medium by assigning input image data, that has been quantized to n-valued data (n≧3; n is a natural number) at a predetermined resolution, to a dot matrix, and ejecting ink in a dot pattern of the assigned dot matrix, comprising:
matrix storage means for pre-storing a plurality of dot matrices having different dot patterns with respect to input image data of an identical signal level;
random number generation means for generating an arbitrary random number value consisting of a predetermined number of bits; and dot matrix assignment means for selecting a given dot matrix corresponding to a signal level of the input image data from the plurality of dot matrices stored in said matrix storage means on the basis of the random number value acquired from said random number generation means, assigning the selected dot matrix to the input image data, and rasterizing a dot pattern of the assigned dot matrix on a buffer, wherein said dot matrix assignment means assigns the dot matrix in accordance with a remainder obtained by dividing the random number value acquired from said random number generation means by the number of patterns of the plurality of dot matrices.

17. The printer according to claim 16, wherein said dot matrix assignment means offsets the random number value acquired from said random number generation means by a predetermined value in units of rasters.

* * * * *